(12) United States Patent
Rodrigues

(10) Patent No.: US 11,679,995 B2
(45) Date of Patent: Jun. 20, 2023

(54) METHODS FOR PREPARING POROUS NANOCOMPOSITE POLYMER HYDROGEL BEADS FOR WATER TREATMENT

(71) Applicant: University of Houston System, Houston, TX (US)

(72) Inventor: Debora F. Rodrigues, Houston, TX (US)

(73) Assignee: UNIVERSITY OF HOUSTON SYSTEM, Houston, TX (US)

(*) Notice: Subject to any disclaimer, the term of this patent is extended or adjusted under 35 U.S.C. 154(b) by 1047 days.

(21) Appl. No.: 16/426,295

(22) Filed: May 30, 2019

(65) Prior Publication Data

US 2019/0292074 A1  Sep. 26, 2019

Related U.S. Application Data

(62) Division of application No. 14/730,968, filed on Jun. 4, 2015, now Pat. No. 10,364,163.

(Continued)

(51) Int. Cl.
*C02F 1/28* (2023.01)
*C08L 5/04* (2006.01)
(Continued)

(52) U.S. Cl.
CPC .......... *C02F 1/285* (2013.01); *B01D 67/0006* (2013.01); *B01D 67/0079* (2013.01); (Continued)

(58) Field of Classification Search
CPC .......... C02F 1/285; C02F 1/288; C02F 1/281; C02F 1/283; C02F 1/286; C02F 1/44; C02F 2101/20; C02F 2303/04; C02F 2305/08; B01D 67/0006; B01D 67/0079; B01D 67/0088; B01D 69/147; B01D 69/148; B01D 71/021; B01D 71/024; B01D 71/08; B01D 71/38; B01D 71/40; B01D 71/60; B01D 2323/21; B01D 2323/30; B01J 20/00; B01J 20/06; B01J 20/205; B01J 20/24; B01J 20/264; B01J 20/28007; B01J 20/28045; B01J 20/28047; B01J 2220/445; B01J 2220/46; B01J 2220/56; C08K 3/04; C08K 3/042; C08K 3/22; C08K 2003/2255; C08L 5/04; C08L 5/08; C08L 33/02; C08L 79/02; C08G 73/0206
(Continued)

(56) References Cited

U.S. PATENT DOCUMENTS

2013/0240437 A1* 9/2013 Rodrigues .............. B01D 69/02
  210/500.28
2013/0240439 A1* 9/2013 Pradeep ............. B01J 20/28016
  428/458

OTHER PUBLICATIONS

Dai et al., (Simple method for preparation of chitosan/poly(acrylic acid) blending hydrogel beads and adsorption of copper(II) from aqueous solutions. Chemical Engineering Journal, 2010. 165(1): p. 240-249), (Year: 2010).*

(Continued)

*Primary Examiner* — Hayden Brewster
(74) *Attorney, Agent, or Firm* — Jackson Walker LLP

(57) ABSTRACT

Synthesis, fabrication, and application of nanocomposite polymers in different form (as membrane/filter coatings, as beads, or as porous sponges) for the removal of microorganisms, heavy metals, organic, and inorganic chemicals from different contaminated water sources.

9 Claims, 14 Drawing Sheets

Related U.S. Application Data

(60) Provisional application No. 62/009,060, filed on Jun. 6, 2014.

(51) Int. Cl.
| | | |
|---|---|---|
| C08L 5/08 | (2006.01) | |
| C08K 3/04 | (2006.01) | |
| B01J 20/24 | (2006.01) | |
| B01J 20/20 | (2006.01) | |
| C08L 33/02 | (2006.01) | |
| C08L 79/02 | (2006.01) | |
| B01D 67/00 | (2006.01) | |
| B01D 69/14 | (2006.01) | |
| B01J 20/00 | (2006.01) | |
| B01J 20/06 | (2006.01) | |
| B01J 20/26 | (2006.01) | |
| B01J 20/28 | (2006.01) | |
| C08K 3/22 | (2006.01) | |
| C02F 1/44 | (2023.01) | |
| B01D 71/08 | (2006.01) | |
| B01D 71/02 | (2006.01) | |
| B01D 71/38 | (2006.01) | |
| C08G 73/02 | (2006.01) | |
| B01D 71/40 | (2006.01) | |
| B01D 71/60 | (2006.01) | |
| C02F 101/20 | (2006.01) | |

(52) U.S. Cl.
CPC ....... *B01D 67/0088* (2013.01); *B01D 69/147* (2013.01); *B01D 69/148* (2013.01); *B01J 20/00* (2013.01); *B01J 20/06* (2013.01); *B01J 20/205* (2013.01); *B01J 20/24* (2013.01); *B01J 20/264* (2013.01); *B01J 20/28007* (2013.01); *B01J 20/28045* (2013.01); *B01J 20/28047* (2013.01); *C02F 1/288* (2013.01); *C08K 3/04* (2013.01); *C08K 3/042* (2017.05); *C08K 3/22* (2013.01); *C08L 5/04* (2013.01); *C08L 5/08* (2013.01); *C08L 33/02* (2013.01); *C08L 79/02* (2013.01); *B01D 71/021* (2013.01); *B01D 71/024* (2013.01); *B01D 71/08* (2013.01); *B01D 71/38* (2013.01); *B01D 71/40* (2013.01); *B01D 71/60* (2013.01); *B01D 2323/21* (2013.01); *B01D 2323/30* (2013.01); *B01J 2220/445* (2013.01); *B01J 2220/46* (2013.01); *B01J 2220/56* (2013.01); *C02F 1/281* (2013.01); *C02F 1/283* (2013.01); *C02F 1/286* (2013.01); *C02F 1/44* (2013.01); *C02F 2101/20* (2013.01); *C02F 2303/04* (2013.01); *C02F 2305/08* (2013.01); *C08G 73/0206* (2013.01); *C08K 2003/2255* (2013.01)

(58) Field of Classification Search
USPC .................................. 210/263, 660
See application file for complete search history.

(56) References Cited

OTHER PUBLICATIONS

Anisha et al. (Chitosan-hyaluronic acid-nano silver composite sponges, International J. of Biological Macromolecules, pp. 310-320, Sep. 20, 2013). (Year: 2013).*

* cited by examiner

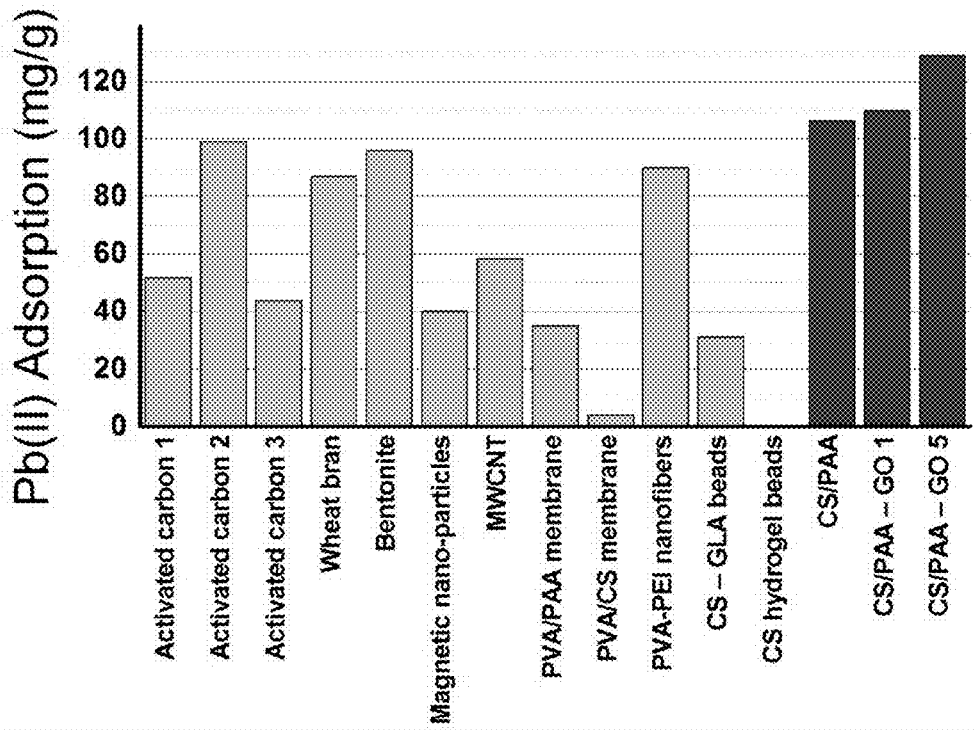

| Adsorbent Material | Q (mg/g) | Source |
|---|---|---|
| Activated carbon 1 | 51.81 | Mohammadi et al (2010) |
| Activated carbon 2 | 99 | Li and Wang (2009) |
| Activated carbon 3 | 43.85 | Acharya et al (2009) |
| Wheat bran | 87 | Bulut and Baysal (2006) |
| Bentonite | 95.88 | Randelovich et al (2012) |
| Magnetic nano-particles | 40.1 | Tan, Chen and Hao (2012) |
| MWCNT | 58.26 | Vukovic et at (2011) |
| PVA/PAA membrane | 35 | Bessbousse et al (2012) |
| PVA/CS membrane | 4 | Bessbousse et al (2012) |
| PVA-PEI nanofibers | 90.03 | Wang et al (2011) |
| CS – GLA beads | 31.2 | Ngah and Fatinathan (2008) |
| CS hydrogel beads | 0.42 | Yan and Bai (2004) |
| CS/PAA | 106.41 | This study |
| CS/PAA – GO 1 | 110 | This study |
| CS/PAA – GO 5 | 129 | This study |

FIGURE 19

METHODS FOR PREPARING POROUS NANOCOMPOSITE POLYMER HYDROGEL BEADS FOR WATER TREATMENT

RELATED APPLICATIONS

This application is a divisional of U.S. patent application Ser. No. 14/730,968, entitled "Porous Nanocomposite Polymer Hydrogels for Water Treatment," filed Jun. 4, 2015, which claims priority to U.S. Provisional Patent Application Ser. No. 62/009,060, entitled "Nanocomposite Hydrogel Polymer Beads for Water Treatment," filed Jun. 6, 2014, the entire contents of which are hereby incorporated by reference.

BACKGROUND

This disclosure pertains to the production and application of porous nanocomposite polymers for the removal of chemical and biological contaminants from water.

Water is essential for life and is globally available in abundance, yet 1 out of every 6 people living today does not have adequate access to clean water. Even though there are several drinking water treatment technologies available today, they are not widely distributed and suitable for all types of water contamination because they have different treatment efficiencies and costs, and in some cases these technologies require trained personnel.

Water contamination is exacerbated by vital industries such as lead smelting, electroplating, petroleum and electronics, which discharge contaminants into the environment. To deal with this problem, various technologies have been developed to remove contaminants from waste streams, such as coagulation, ion-exchange, chemical precipitation, membrane processes, and adsorption. However, most of these methods suffer significant drawbacks, like high capital and operational costs, inappropriate efficiencies at usual discharge levels, and the production of residual toxic sludge and secondary wastes that are difficult and expensive to treat.

Set against the limitations above, adsorption has become a valuable alternative because of the low cost of adsorbent materials, low operating cost, high efficiency for dilute solutions, ease in handling, and minimal sludge production. More particularly, biosorption has been getting considerable attention because biological materials are naturally available, cheap and harmless. However, the biological materials utilized must be processed in unique ways in order to maintain or maximize adsorption capacity while also promoting strength and durability.

SUMMARY

The present disclosure relates generally to the fabrication and application of porous nanocomposite polymers for the removal of microorganisms, heavy metals, organic and inorganic chemicals from different water sources.

The porous nanocomposite polymers contain nanomaterials (carbon or metal oxide nanoparticles) that have anti-microbial properties and adsorption capacities for heavy metals and other cations. Additionally, uniquely designed metal oxide particles present in these beads have photocatalytic capacity to enhance photochemical degradation of organic and biological contaminants in the water. Besides nanoparticles, these porous nanocomposites are made of natural biopolymers that are easily available, have low cost of fabrication and are biocompatible. The unique blend of polymers in these nanocomposites makes possible for the removal of both organic and inorganic chemicals, such as urea, humic acids, phosphates, nitrates, heavy metals and radioactive materials. The process of fabrication is also facile and cost effective. The present disclosure relates to the synthesis of nanocomposite polymers for the synthesis of porous hydrogel beads, porous nanobeads/colloids, surface or membrane coatings, and nanocomposite sponges for the removal of chemical and biological contaminants in water. These nanocomposites can be used in fluidized bed reactors or packed in columns with different sizes or as coatings for membrane filtration, which will allow the treatment of different volumes of water. Therefore, this system, depending on the size of the column, will serve to treat water from small to large scales. The uniqueness of this system is that the nanocomposite polymers produced are multifunctional and can be easily expanded and modified to remove different pollutants in water.

In one example, graphene oxide (GO) was successfully incorporated into a chitosan-poly (acrylic acid) (CS-PAA) polymer matrix. The nanocomposite hydrogel beads have the ability to remove high levels of heavy metal from solution. These beads can be used in packed bed columns in different heights and flow rates to maximize the contaminant removal in diverse volumes of water.

Another example, graphene oxide (GO) was successfully incorporated into chitosan-Polyethylenimine (CS-PEI) polymer matrix or in alginate-Polyethylenimine (AG-PEI). These nanocomposites were synthesized as porous hydrogel beads, colloidal (nanobeads) suspensions, and solid hydrogels or as a coating material for membranes and filters. These nanocomposites can also be freeze-dried to form porous sponges. These nanocomposites have the ability to remove high levels of heavy metals, total organic carbon (TOC), nitrates and phosphates. These nanocomposites can also be used in packed bed columns or in fluidized beds to maximize the contaminant removal in different volumes of water.

Chitosan (CS) is an example of a biosorbent used in removing heavy metals since it contains amine and hydroxyl groups that can form complexes with various heavy metal ions. CS is also an ideal material since it is derived from a naturally-occurring and abundant biopolymer, chitin, which is freely available in large quantities from seafood processing waste. In order to use CS as an adsorbent, CS needs to be cross-linked to improve its acidic resistance and enhance mechanical strength. The crosslinking process, however, decreases the number of amine groups, which in return, reduces its adsorption capacity. To overcome this issue, various polymers have been combined with chitosan via surface modification or interpenetrating network in order to impart additional functional groups and enhance CS sorption capacity. In particular, poly(acrylic acid) (PAA) has been incorporated into chitosan because it contains many carboxyl groups and has an anionic polyelectrolyte form, which allows higher heavy metal removal.

Chitosan is a preferred polymer to make the beads because it occurs naturally in abundance, is biocompatible, has some anti-microbial properties and is renewable since it is a waste product from the crab and shrimp canning industries. Poly(acrylic) acid (PAA), is used in this disclosure as a preferred co-polymer because, like chitosan, it also has heavy metal binding capacities, is commercially produced in large scale, and is widely used in various industries, agriculture, and medicine. PAA has not been described as having any anti-microbial properties; however, several reports describe chitosan's and GO anti-microbial properties.

Other natural polymers besides chitosan, such as alginate, can also be used for the fabrication of polymer beads with nanomaterials. The PAA in the beads can also be replaced by other functional polymers, such as Polyethylenimine (PEI), Poly(vinyl alcohol) (PVA), Poly (allyl amine hydrochloride), Cyclodextrin polyurethanes (CDP), and Triallylamine polymer (TAP) among others to generate beads with capacity to remove different hazardous chemicals, such as anions, cations, and organic matter.

Recently, nanomaterials have been increasingly used to remove heavy metals owing to their enhanced reactivity and higher specific surface area. When combined with polymers, they form a new line of nanohybrid adsorbent materials. Graphene-based polymer nanocomposites are one of the most promising materials in this category. To date, no such nanocomposite material incorporating GO into a CS-PAA or CS-PEI polymer hydrogel matrices has been synthesized and investigated for the removal of heavy metals, nitrate, phosphorous and TOC.

The addition of carbon based nanomaterials in the current nanocomposite polymer beads, such as graphene oxide, can enhance the adsorption capacity of these beads for heavy metals and inactivate microorganisms. Instead of adding graphene to these beads, it is also possible to add metal oxide nanoparticles, such as, molybdenum oxide, zinc oxide and titanium dioxide or nanohybrid nanoparticles, such as GO-$MoO_2$ and GO-$TiO_2$. These metal nanoparticles can enhance photo inactivation of microorganisms and photocatalysis of organic chemicals in the water.

A significant advantage of the nanocomposite polymer is that the combination of two or more polymers with nanomaterials can generate enhanced removal of organic and inorganic chemicals, as well as inactivation of microorganisms simultaneously. These nanocomposite polymers are also reusable and can be regenerated. They can be also used to coat filters and membranes to enhance their water treatment capabilities.

A packed bed filtration device made up of the nanocomposite polymer beads could be used for the treatment of fracking water, waste water, and water used by campers and travelers at rivers and lakes, and would be particularly useful for the manufacture of different types of water filters.

BRIEF DESCRIPTION OF THE DRAWINGS

FIG. 19 shows a comparison of the present nanocomposite beads with current adsorbent materials on the market for the removal of lead;

DETAILED DESCRIPTION OF PREFERRED EMBODIMENTS

The present disclosure relates to the synthesis of nanocomposite polymers for the synthesis of porous hydrogel beads, porous nanobeads/colloids, surface or membrane coatings, and nanocomposite sponges for the removal of chemical and biological contaminants in water. The nanocomposite polymers are preferably used in a packed bed columns or fluidized bed reactors or as coatings in filter membranes (FIG. 4).

Figure 1:
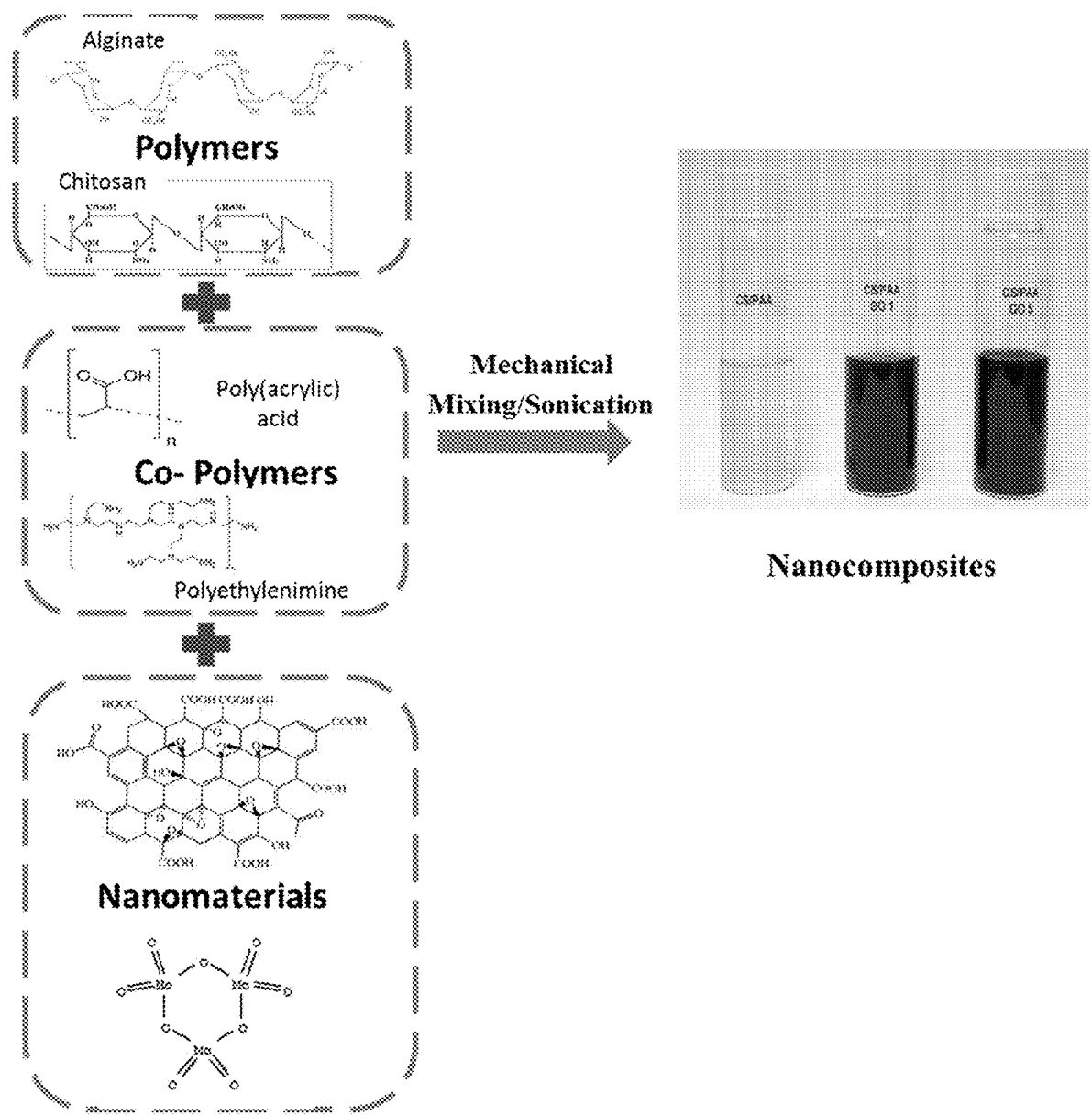
FIG. 1 shows a general scheme for the synthesis of porous nanocomposite polymers and the results of the dispersion. By combining alginate or chitosan with a functional co-polymer and the nanomaterials it is possible with the addition of gluteraldehyde, to produce porous nanocomposite polymers.
Figure 4:
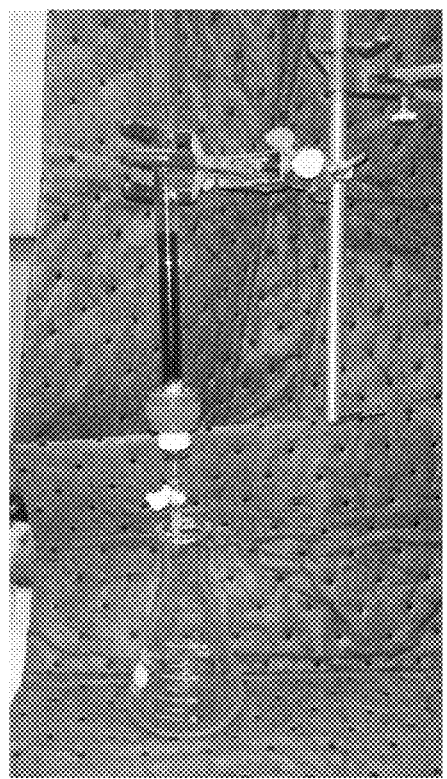
FIG. 4 shows the use of the porous nanocomposites beads for the removal of contaminants in water in a packed bed column.

FIG. 1 shows a general scheme for the fabrication and application of nanocomposite polymers in a packed bed column (FIG. 4). Polymers, such as chitosan or alginate and poly(acrylic) acid (PAA) or polyethylenimine (PEI), are combined with nanomaterial fillers, such as graphene oxide (GO) or Molybdenum trioxide ($MoO_3$). This blend is then mixed with gluteraldehyde to cross-link the nanomaterials and polymers and produce different forms of nanocomposites. The nanocomposites have anti-microbial properties that are effective against microbes due to the production of reactive oxygen species, facilitation of cellular damage, interruption of metabolic activity, and similar mechanisms. The beads also facilitate the adsorption and removal of contaminants, which is impacted by functional groups, bead size, and pH. Packed bed columns or fluidized bed reactors containing the nanocomposite polymer beads or sponges can be used for effective removal of heavy metals and microbes from an influent contaminated water stream by passing it through the column, with the residual metal concentration and microorganisms found in the effluent stream being reduced. Flow rate and amount of beads in the column may be adjusted to produce the desired results. These nanocomposites can also be used to coat membranes and filters for water treatment.

One of the major challenges for incorporation of nanomaterials into nanocomposites is obtaining uniform dispersion in the polymer matrix. The combination of the polymers, such as CS and PAA or alginate and PEI, with the sonication method has been shown to uniformly disperse carbon-based nanofillers in the CS-PAA matrix. The scheme of the preparation of the nanocomposites and the results of the dispersion are presented in FIG. 1. FIG. 1 shows well-dispersed suspensions of 1% and 5% GO in CS-PAA composite. The GO remained well-dispersed three weeks after preparation.

Figure 5:
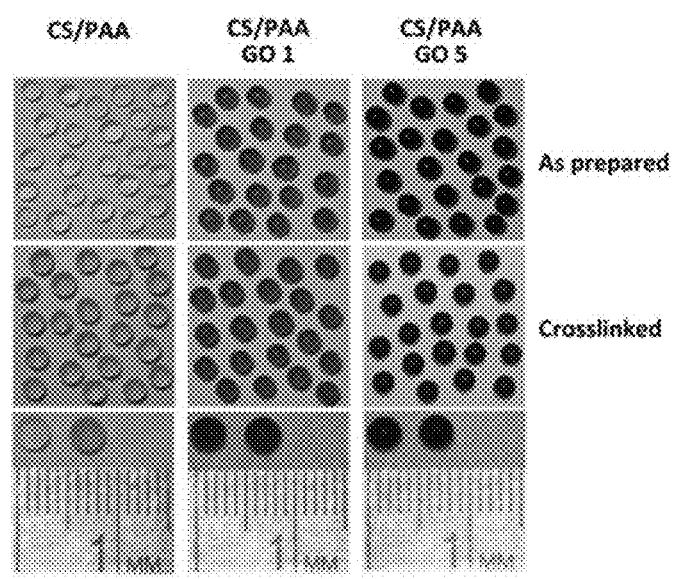
FIG. 5 shows beads prepared containing 0%, 1%, and 5% graphene oxide (GO) in the chitosan-poly(acrylic) acid (CS-PAA) polymer blend, both as prepared and after cross-linking with glutaraldehyde.
Figure 6:
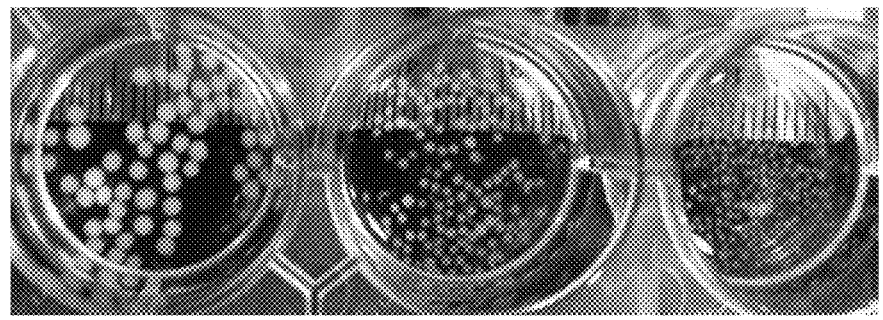
FIG. 6 shows macroimages of different sizes of hydrogel beads produced.

After the preparation of well-dispersed solutions of polymer composites with GO or $MoO_3$, beads are preferably synthesized by coagulation or by just adding a crosslinking reagent (such as, but not limited to, gluteraldehyde, epichlorohydrin, glyoxal, and 1-ethyl-3-(3-dimethylaminopropyl) carbodiimide together with N-hydroxysuccinimide) that will lead to the solidification of the nanocomposite polymers. For the chitosan, sodium hydroxide may be used as a coagulating agent. In the case of alginate, hydrochloric acid may be used as a coagulant. Alternatively, the nanocomposite can be mixed with gluteraldehyde or other crosslinking reagents to form the beads or the membrane coatings without the need of a coagulant. FIG. 5 shows beads prepared containing 0%, 1%, and 5% GO in the CS-PAA polymer blend. FIG. 5 shows the beads as prepared and after cross-linking with glutaraldehyde. The size of the beads prepared was around 2 to 3 mm, but smaller beads could also be achieved with a smaller syringe gauge to increase the surface area-to-volume ratio (FIG. 6). The preparation of alginate beads is also possible, replacing chitosan. Other polymers besides PAA and PEI could also be incorporated into the chitosan or alginate polymer beads.

Example 1. Synthesis of Nanocomposites Coatings for Membranes and Filters

Figure 2:
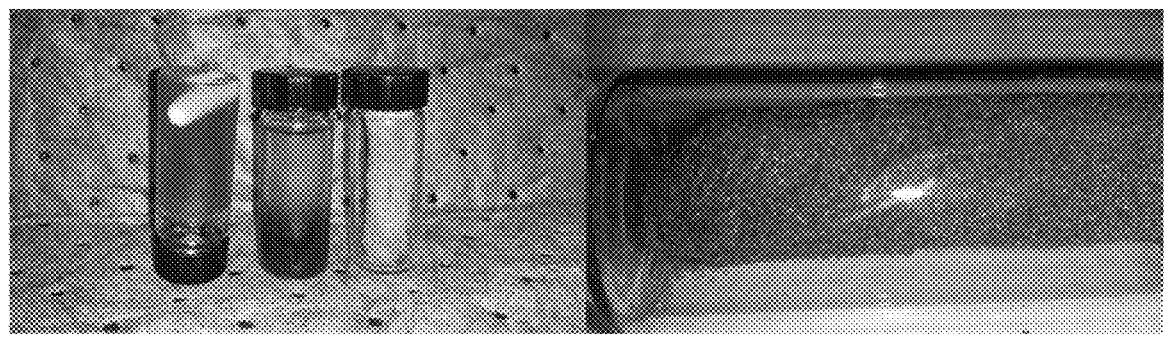
FIG. 2 shows the different forms that the porous nanocomposites can be produced. In the first picture, the first tube contains the nanocomposite in a solid hydrogel form, the second tube contains nanobeads of nanocomposite hydrogel particles in suspension, and the third tube contains the freeze-dried nanocomposite hydrogel, which formed a porous sponge. The second picture zooms in the freeze-dried nancomposite hydrogel showing that it forms a porous sponge.
Figure 3:
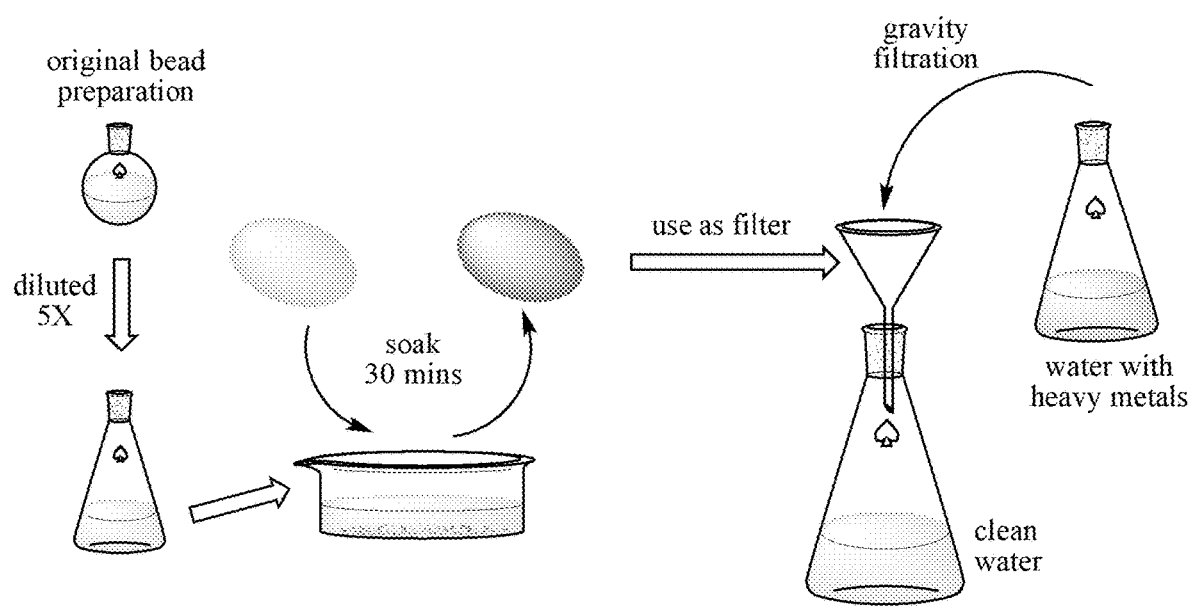
FIG. 3 shows the general scheme for coating surfaces, membranes and filters with the nanocomposite polymers.

The synthesis of alginate-polyethylenimine (PEI) and chitosan-polyethylenimine (PEI) polymer nanocomposites containing graphene oxide (GO) was successfully achieved. The nanocomposites were prepared in different forms (FIG. 2). It was possible to prepare the nanocomposite as a hydrogel block, a hydrogel micro and nanobeads, as a sponge or as a coating material for membrane filtration (FIGS. 2, 3 and 6).

The hydrogel nanocomposites were made of 0.2 to 4% alginate or chitosan as supporting materials for the co-polymers and nanomaterials to form solid structures, such as beads, hydrogels, and sponges. The concentrations of the nanomaterials, in this case GO, were in the range of 0 ppm to 5000 ppm. The co-polymers, in this case PEI, had a concentration of 5 to 30% (w/v %). After preparing this mixture, gluteraldehyde (0.5 to 5% (v/v %)) was added to crosslink the components of the nanocomposite mixture. For the filter preparation, the nanocomposite mixture containing gluteraldehyde was used for the coating (FIG. 3). For the filter, coagulation with NaOH or HCl was not necessary. To form the hydrogel blocks or beads, the coagulation of the nanocomposites was done with NaOH or HCl. For the preparation of the sponges the hydrogel blocks were freeze-dried between 6 h to 24 h depending on the size of the hydrogel blocks.

Figure 8:
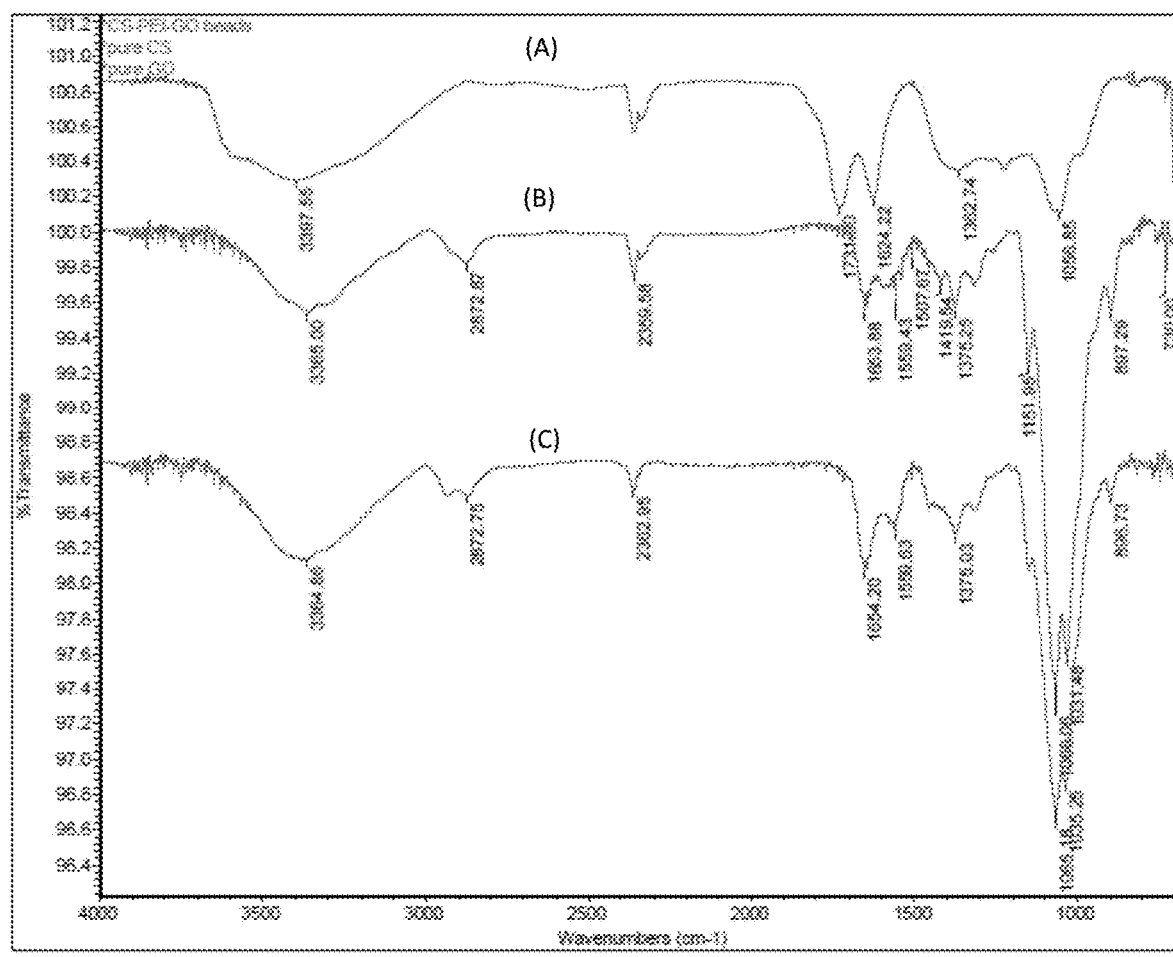
FIG. 8 shows ATR-IR spectra of (a)CS-PEI-GO, (b) CS, and (C) GO.
Figure 9:
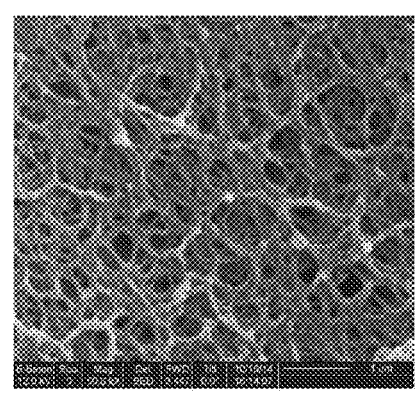
FIG. 9 shows scanning electron microscopy of a cross section of the bead demonstrating the bead porosity.
Figure 10:
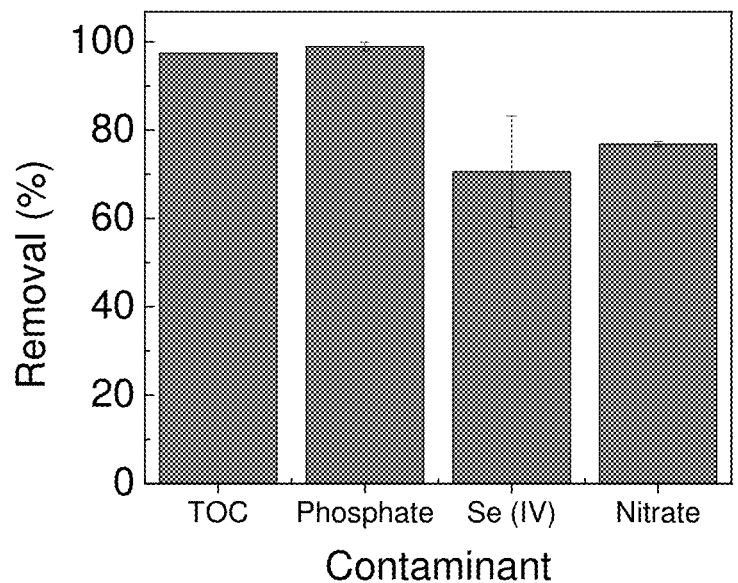
FIG. 10 shows average removal of anionic contaminants in water by CS-PEI-GO. The initial concentration of the contaminants was: 50 ppm for Total Organic Carbon (TOC) from humic acids, 4 ppm of Inorganic Phosphate ($KH_2PO_4$), 10 ppm of Selenium (Se(IV)), and 11 ppm of $NO^3$—N.
Figure 11:
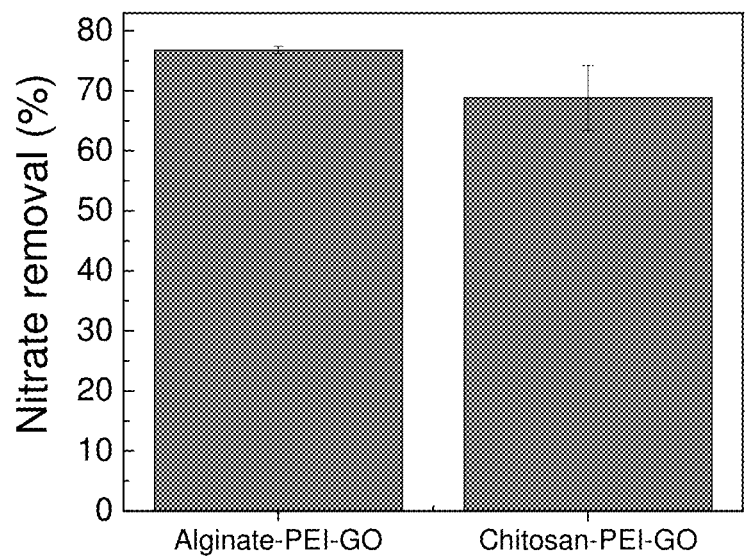
FIG. 11 shows average removal of 11 ppm of $NO^3$—N in water by Alginate-PEI-GO and CS-PEI-GO, which demonstrate that alginate and chitosan are interchangeable in the nanocomposite since they give similar results.

In order to characterize the nanocomposite produced and filter coatings with the nanocomposites, the functional groups were determined through attenuated total reflectance-infrared spectroscopy (ATR-IR) (FIG. 8). The nanocomposite mixture, as well as the pure chitosan and GO nanomaterials were deposited onto membrane filters and analyzed using a Nicolet iS10 Mid Infrared FTIR Spectrometer (Thermo Fisher Scientific) equipped with a ZnSe crystal. Processing of the data was done using Omnic 8 software (Thermo Fisher Scientific).

In a typical FTIR spectrum of chitosan, representative peaks includes 2872 $cm^{-1}$ of C—H stretching vibration due to the pyranose ring, 1603 $cm^{-1}$ of N—H stretching vibration in CO—NH group, 1156 $cm^{-1}$ of C—O—C anti-symmetric stretching vibration and 1082 $cm^{-1}$ of C—O stretching vibration due to the pyranose ring, which are in accordance with the literature (Yang, et al., 2010). Comparing with CS, several changes were found in the spectrum of CS-PEI-GO. New bands appeared at 1730, 1620 and 1362 $cm^{-1}$ and were attributed to the formation of C=O, C=N, and N—O asymmetric stretch vibrations due to the successful incorporation of GO and PEI into chitosan.

Example 2. Synthesis of Nanocomposite Beads

The synthesis of chitosan-poly(acrylic acid) (CS-PAA) polymer hydrogel beads containing graphene oxide (GO) was successfully achieved. The hydrogel beads used in this study were prepared using a one-step preparation method that improved on already-facile methods developed for the production of chitosan-based hydrogel beads (Dai, J., et al., Simple method for preparation of chitosan/poly(acrylic acid) blending hydrogel beads and adsorption of copper(II) from aqueous solutions. Chemical Engineering Journal, 2010. 165(1): p. 240-249, incorporated herein by reference). Chitosan (CS), poly(acrylic acid) (PAA) with an average molecular weight of 450,000, and methanol were purchased from Sigma Aldrich. Graphite (~10 mesh, 99.9% metal basis) and NaOH were obtained from Alfa Aesar. Glutaraldehyde (GLA), $Pb(NO_3)_2$, $H_2SO_4$, $KMnO_4$ and HCl were purchased from Fisher Scientific. $NaNO_3$ and $H_2O_2$ were obtained from Merck and Macron, respectively. All the chemical reagents used were analytical grade and were used without further purification. All aqueous solutions were prepared using deionized (DI) water. GO was synthesized using the modified Hummers' method (Hummers Jr, W. S. and R. E. Offeman, Preparation of graphitic oxide. Journal of the American Chemical Society, 1958. 80(6): p. 1339-1339, incorporated herein by reference. See also, I. E. M. Carpio, C. M. Santos, X. Wei and D. F. Rodrigues, Toxicity of a polymer-graphene oxide composite against bacterial planktonic cells, biofilms, and mammalion cells. Nanoscale, 2012, 4, 4746-4756, incorporated herein by reference).

To produce the hydrogel beads, 2% (wt/v) CS and 1.5% (wt/v) PAA were prepared by dissolving in 0.5% (v/v) HCl solution. The use of polymerized acrylic acid has enabled the sequential dissolution of the different components into a single polymeric solution that was at-once ready for co-precipitation in alkaline solution. In the production of GO-nanocomposite beads, GO stock solution was prepared by dissolving powdered GO in 0.5% HCl solution with subsequent sonication to guarantee dispersion. This stock solution was added to the blended CS-PA polymers to obtain final products that contained 1% and 5% GO by weight with respect to polymer content. Henceforth, such beads will be referred to as GO1 and GO5, respectively. Each solution was stirred for 20 h to ensure homogeneity and left to stand for 22 h before dropping into 1.5 M NaOH solution stirred at 100 rpm. To control the bead size, the solutions were placed inside syringes fitted with 23G1 Precision Glide needles (BD) and dropped at a rate of 1 mL/min using a variable speed pump injector. The contact of the solution with basic media led to immediate hydrogel bead formation. The beads were removed and washed with copious amounts of water to remove the excess NaOH and until the pH was neutral. Prior to adsorption testing, the beads were cross-linked for 30 min in 0.5% glutaraldehyde (GLA) solution and rinsed with DI water to remove the excess GLA.

The prepared CS-PAA, GO1 and GO5 solutions showed good stability and no observable phase separation occurred even after several months. This stability was maintained until hydrogel formation and enhanced with the crosslinking process using GLA. Macroimages of the hydrogel beads are shown in FIG. 5 and they show spherical beads with an average diameter of 3 mm. FIG. 5 shows macroimages of (A)CS-PAA, (B) GO1 and (C) GO5 hydrogel beads. The left side images for each pair are the as-prepared beads while the ones on the right have been crosslinked with GLA. Crosslinking turned the opalescent CS-PAA beads into laser lemon color while the color change was barely visible for the GO-infused beads. When the wet beads were dried in a vacuum desiccator it was found that the CS-PAA, GO1 and GO5 beads had hydration values of 97.95%, 97.85% and 97.74%, respectively. These values are reflective of the increase in polymer mass with the addition of the graphene oxide nanomaterial.

In order to further characterize the hydrogel beads, functional groups were determined through attenuated total reflectance-infrared spectroscopy (ATR-IR). The different polymer mixtures were deposited onto membrane filters and analyzed using a Nicolet iS10 Mid Infrared FTIR Spectrometer (Thermo Fisher Scientific) equipped with a ZnSe crystal. Processing of the data was done using Omnic 8 software (Thermo Fisher Scientific). A hydration test was also conducted to determine the water content and polymer mass using Eq. 1:

$$\text{Hydration (\%)} = \frac{(W_h - W_d)}{W_h} \times 100$$

where $W_h$ and $W_d$ are the weights of the hydrated and dry beads, respectively. Drying of the beads was carried out in a vacuum desiccator until constant weight.

Figure 7:
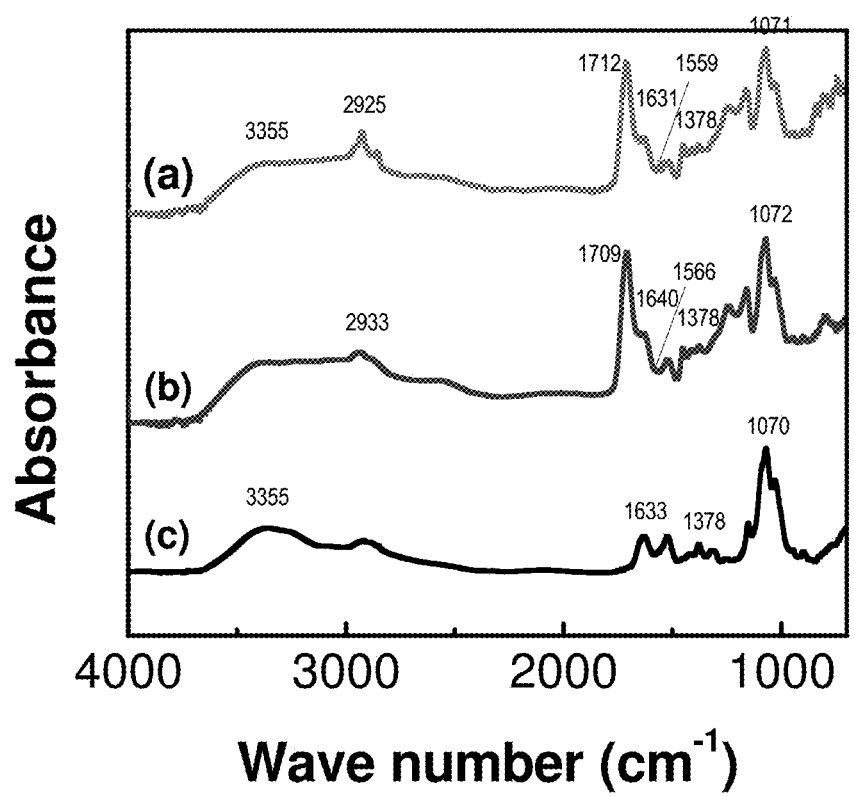
FIG. 7 shows ATR-IR spectra of (a)CS-PAA with 5% GO, (b)CS-PAA and (c) CS.

The FTIR spectra (FIG. 7) were obtained for (a) GO5, (b)CS-PAA and (c) CS and the peaks observed were consistent with those reported in literature. The peaks indicate the interactions of the polymers and the nanomaterial. The presence of characteristic PAA peaks in (b) relative to (a) indicate the production of interpenetrating CS-PAA polymer network. Downshifted peaks in (a) are characteristic of the presence of CS within the network. In the CS spectra, the overlapping peaks around 3355 cm$^{-1}$ show the stretching vibrations of —OH and —NH. The peak at 1633 cm$^{-1}$ corresponds to the bending vibration of the primary amino group while the peak at 1378 cm$^{-1}$ show the C—H stretching vibration of the alkyl group of the polymeric structure. On the other hand, the peak at 1070 cm$^{-1}$ shows the —C═O stretching vibration. With the addition of PAA, a sharp peak at 1709 cm$^{-1}$ is observed which shows the —COOH stretching vibration. Peaks at 1566 cm$^{-1}$ and 1409 cm$^{-1}$ are also observed to occur corresponding to the asymmetric and symmetric vibrations of —COO$^-$, respectively. The presence of these peaks indicates the successful blending of PAA and CS. Meanwhile, the similarity of the GO5 curve to that of the CS-PAA curve indicates that the addition and co-precipitation of GO did not significantly alter the CS-PAA semi-interpenetrating polymer network nor destroy the functional groups present. However, downshifting is noted for the 1566 cm$^{-1}$, 1640 cm$^{-1}$ and 2933 cm$^{-1}$ peaks, the latter of which corresponds to the C—H stretching vibration of the alkyl group. The downshifting indicated the presence of the interaction of GO with the polymeric network which is mainly physical in nature.

Example 3. Batch Lead Adsorption Experiments

Stock solutions of 2,000 mg/L Pb$^{2+}$ were prepared by dissolving appropriate amounts of Pb(NO$_3$)$_2$ in Millipore water. Different working solutions for the batch adsorption experiments were obtained by serial dilution of the prepared stock. The batch adsorption experiments were conducted at room temperature in covered Erlenmeyer flasks using a platform shaker (New Brunswick Scientific) at 130 rpm. Pb$^{2+}$ analyses were done using an AAnalyst 200 Atomic Adsorption Spectrometer (PerkinElmer).

The effect of pH on the adsorption rate was evaluated at the pH range of 2.0-6.0. The initial pH values of Pb$^{2+}$ solutions were adjusted using 0.1 M and 0.01 M HCl and NaOH solutions. Adsorption assays were carried out for 24 h using 40 mL of 100 ppm Pb$^{2+}$ solution. The metal uptake, Q (mg/g), was calculated according to Eq. 2:

$$Q = \frac{(C_0 - C_e)V}{m}$$

where $C_o$ (mg/L) and $C_e$ (mg/L) are the initial and final Pb$^{2+}$ concentrations in solution, respectively, V (L) is the volume of Pb$^{2+}$ solution, and m (g) is the weight of dry hydrogel beads.

Figure 14:
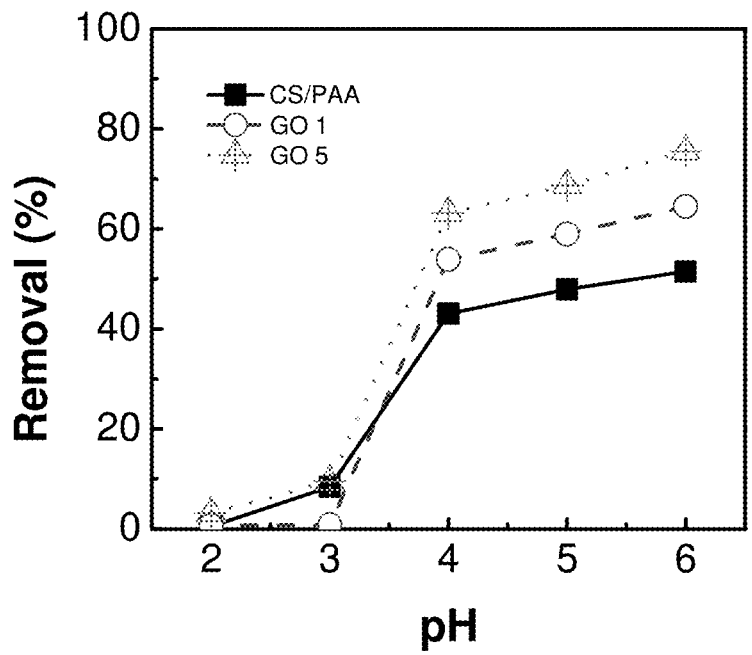
FIG. 14 shows average removal of $Pb^{2+}$ ions from solutions of various pH values by CS-PAA-GO nanocomposites.

It is generally observed that the uptake capacity of adsorbent materials is affected by solution pH. For this reason, the removal of Pb$^{2+}$ ions by the CS-PAA, GO1 and GO5 hydrogel beads was investigated at pH values ranging from 2.0 to 6.0 and the results are shown in FIG. 14. FIG. 14 shows average removal of Pb$^{2+}$ ions from solutions of various pH values. The effect of pH on adsorption is significant for all materials tested and removal is significantly better starting at pH 4.0. Note the consistently better performance of the GO-infused beads over the CS-PAA hydrogel beads and the enhanced removal owing to the addition of more nanomaterial as shown by the better performance of GO5 over GO1. Experimental conditions: $Pb^{2+}$ concentration 100 mg/L, volume 40 mL, dosage 25 g/L, pH range 2.00-6.00, time 24 h.

From FIG. 14, it can be seen that the adsorption capacities of the three hydrogel beads are greatly affected by pH values and the metal uptake properties of the hydrogel beads improved dramatically starting from pH 4.0. This behavior can be attributed to the effect of pH on the ionization states of the functional groups that are present in the adsorbent materials as well as on the solubility of lead in solution. For CS and PAA, the increased acidity caused the protonation of the amine and carboxyl groups thereby inducing an electrical repulsion with the positively-charged lead ions and limiting adsorption. At higher pH, these functional groups get deprotonated and the end effect is the increase of the metal uptake. Adding GO into the polymer matrix only served to magnify this trend. GO added additional —COOH and —OH functional groups and at pH 5.0-7.0 it is theorized that these functional groups became deprotonated and the resulting —COO⁻ and —O⁻ species provided electrostatic attraction for the positively-charged metal ions. Thus even at very small fractions, the amount of GO in the polymer matrix increased the adsorption capacity of the beads significantly.

While removal at pH 6 was highest, spontaneous precipitation of lead hydroxide was observed during pH adjustment to this level. To prevent the contribution of metal precipitation in the removal mechanism, subsequent tests were done at pH 5. The choice of this pH value does not in any way limit real-world applicability since most industrial wastewaters are moderately acidic with pH values between 5 and 6.

The effect of adsorbent dosage was conducted by adding different masses of CS-PAA hydrogel beads into 40 mL of 100 ppm $Pb^{2+}$ solution and allowing contact for 24 h. The metal uptake rates were determined using Eq. 2 while the removal efficiencies were measured using Eq. 3:

$$\text{Removal (\%)} = \left(1 - \frac{C_e}{C_o}\right) \times 100$$

Figure 15:
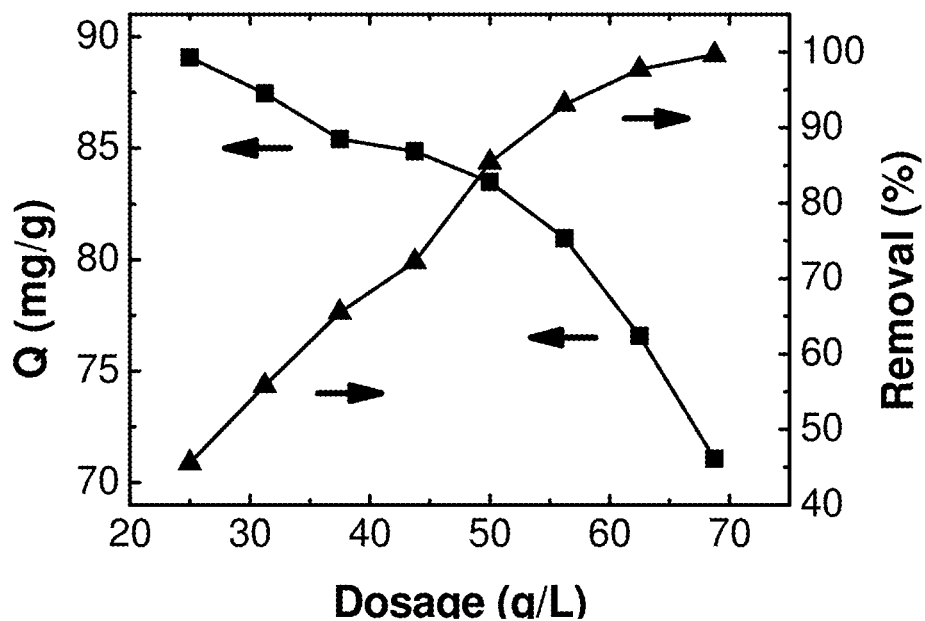
FIG. 15 shows metal uptake rates and removal efficiencies of the CS-PAA beads at different loading ratios.

In order to determine the minimum optimal performance among the three materials, the efficiency of the CS-PAA beads was evaluated at different loading ratios ranging from 25.0-68.75 g/L of beads in 40 mL of $Pb^{2+}$ solution at pH 5.0. FIG. 15 shows metal uptake rates and removal efficiencies of the CS-PAA beads at different loading ratios. While an increase in adsorbent dose results in better $Pb^{2+}$ removal there is a corresponding decrease in metal uptake rates indicating a decrease in efficiency mainly due to the increase in the number of unsaturated sites that remained unutilized at equilibrium. Experimental conditions: $Pb^{2+}$ concentration 100 mg/L, volume 40 mL, dosage 25.00-68.75 g/L, pH 5.0, time 24 h.

As can be seen in FIG. 15, the beads show lead removal rates ranging from 45.5% at the lowest dosage of 25.0 g/L up to 99.6% at the highest dosage of 68.75 g/L. The increase in lead removal is due to the increase in polymer material and the corresponding additional surface area that accompanied this increase. The added surface area meant extra sites for adsorption and this contributed to a 118.9% overall increase in lead removal. However, analysis of the lead uptake curve showed an opposite trend, decreasing by 20.9% per unit mass of CS-PAA when the dosage was increased. This decrease in efficiency is due to the fact that once the interaction between $Pb^{2+}$ and the CS-PAA beads had reached equilibrium, the presence of more adsorbent material translated to some sites remaining unsaturated and therefore unutilized for adsorption. Factoring this added mass into the calculation for lead uptake resulted to a smaller Q value. As the figure indicated, the most economical dosage for the system was 37.5 g/L of CS-PAA beads corresponding to 1.5 g hydrogel beads per 40 mL of $Pb^{2+}$ solution and this ratio was used for the succeeding tests.

Kinetic studies were carried out by adding hydrogel beads to 80 mL of 100 ppm $Pb^{2+}$ solution at pH 5.0. At predetermined times (5-1440 min), 0.5 mL of aliquots were extracted and analyzed for residual $Pb^{2+}$ concentrations. Meanwhile, a same amount of water at pH 5.0 was added into the bulk solution in order to keep the total volume constant. The adsorption rate at any time t, $Q(t_i)$ (mg/g), was calculated using Eq. 4:

$$Q(t_i) = \frac{(C_o - C_{t_i})V_o - \sum_{2}^{i-1} C_{t_i} V_s}{m}$$

where $C_o$ and $C_{t_i}$ (mg/L) are the initial $Pb^{2+}$ concentration and $Pb^{2+}$ concentration at $t_i$, respectively; $V_o$(L) is the volume of $Pb^{2+}$ solution and $V_s$ (L) is the aliquot volume extracted for analytical purposes. Polymer mass, m (g), is reported dry.

Figure 16:
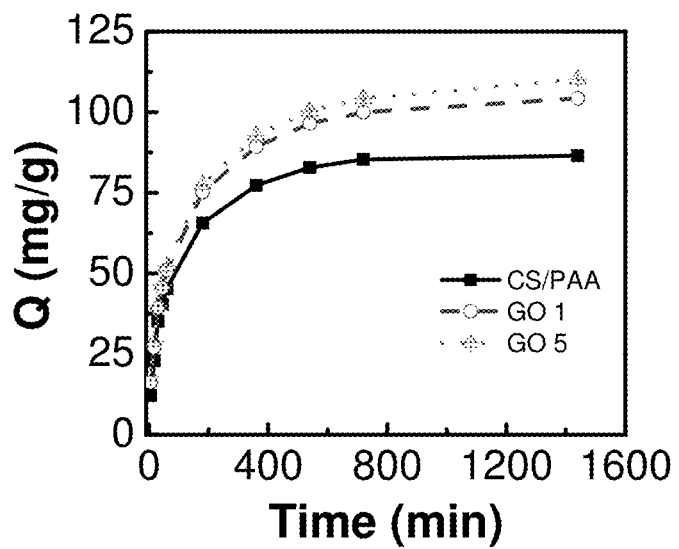
FIG. 16 shows intraparticle diffusion kinetics for the adsorption of lead onto CS-PAA, GO1 and GO5 hydrogel beads.

Adsorption kinetics is an indispensable tool in adsorption studies because it provides understanding of the removal rates of pollutants from aqueous solutions. At the same time it also allows examination of the adsorption behavior and whether such can be described by predictive theoretical models. FIG. 16 shows kinetic adsorption results showing the effect of contact time on the adsorption of $Pb^{2+}$, or the removal of lead ions by the three different hydrogels with respect to time. Lead removal was very fast during the first 60 min of treatment indicating rapid initial external surface deposition mechanism followed by slower internal diffusion. CS-PAA removed 86.48 mg/g $Pb^{2+}$ and the addition of nanomaterial increased the metal uptake by 20.51% for GO1 and 27.39% for GO5. Experimental conditions: $Pb^{2+}$ concentration 100 mg/L, volume 40 mL, dosage 37.5 g/L, pH 5.0, time 5-1440 min. FIG. 16 also clearly shows that removal was enhanced with the addition of nanomaterials and that the amount of GO posted a positive effect on lead removal. It can also be seen that increase in adsorption was minimal during the last 12 h of treatment. This phenomenon indicated that overall the adsorption mechanism started with a rapid external surface deposition followed by a much slower internal diffusion process which may be rate-determining.

In order to examine the adsorption mechanisms, it was necessary to determine the kinetic parameters of the adsorption process using several models. In this work, the pseudo first-order, pseudo second-order and the intraparticle kinetic diffusion models were applied to the experimental data. The pseudo first-order model is linearized using Eq. 6:

$$\ln(Q_e - Q_t) = \ln Q_e - k_1 t$$

The pseudo second-order models is linearized using Eq. 7:

$$\frac{t}{Q_t} = \frac{1}{k_2 Q_e^2} + \frac{t}{Q_e}$$

For both equations, $Q_e$ and $Q_t$ are the amounts of $Pb^{2+}$ adsorbed onto the hydrogel beads (mg $g^{-1}$) at equilibrium and at any time t (min), respectively. The respective rate constants for the pseudo first-order and pseudo second-order adsorption are given by $k_1$ ($min^{-1}$) and $k_2$ ($min^{-1}$). Meanwhile, the intraparticle diffusion model used Eq. 8:

$$Q_t = k_p t^{0.5}$$

where $k_p$ (mg $g^{-1}$ $min^{-1/2}$) is the intraparticle diffusion rate constant.

The experimental data were plotted using the linearized forms of the pseudo first- and second-order kinetic models and the regression formulas were used to obtain the kinetic parameters for the adsorption of lead, which are presented in Table 1 below. Investigation of the data for pseudo first-order kinetics shows a big discrepancy between the experimental and calculated $Q_e$ values for the three adsorbent materials. For the pseudo second-order kinetic model these values are in close agreement and this consistency is confirmed by the extremely high correlation coefficients of more than 0.99 which are higher than those obtained for the pseudo-first order kinetics. These results indicated that the adsorption of lead onto the three hydrogel materials is best described by the pseudo second-order kinetic model and that the rate-determining step was chemisorption involving valence forces between the lead ions and the adsorbent materials either through sharing or exchange of electrons.

at the surface, the second stage (II) is characterized by slow intraparticle diffusion while the third (III) stage is characterized by even slower intraparticle diffusion. The existence of the regions is confirmed by three parametric values $k_{p1}$, $k_{p2}$ and $k_{p3}$ (Table 2 below), which correspond to the rate diffusion constants for regions I, II, and III, respectively. Since $k_{p1}$ is the highest among the three values, it means that the transfer of the lead ions from the bulk phase to the surface occurred the fastest. The lower $k_{p2}$ value shows that the penetration of the lead ions into the inner matrix for the materials occurred more slowly and was therefore rate-limiting, confirming earlier findings. The lowest $k_{p3}$ value resulted from the depletion of lead metal ions from the solution and the establishment of equilibrium at this stage.

TABLE 2

Parameters for the intraparticle diffusion model for the adsorption of $Pb^{2+}$ onto CS-PAA, GO1 and GO5 showing the presence of three stages for adsorption.

| Material | $k_p$ | $R^2$ |
| --- | --- | --- |
| CS-PAA | | |
| $k_{p1}$ (mg $g^{-1}$ $min^{-0.5}$) | 6.19 | 0.986 |
| $k_{p2}$ (mg $g^{-1}$ $min^{-0.5}$) | 1.49 | 0.957 |
| $k_{p3}$ (mg $g^{-1}$ $min^{-0.5}$) | 0.83 | |
| GO1 | | |
| $k_{p1}$ (mg $g^{-1}$ $min^{-0.5}$) | 6.50 | 0.991 |
| $k_{p2}$ (mg $g^{-1}$ $min^{-0.5}$) | 1.87 | 0.966 |
| $k_{p3}$ (mg $g^{-1}$ $min^{-0.5}$) | 0.91 | |
| GO5 | | |
| $k_{p1}$ (mg $g^{-1}$ $min^{-0.5}$) | 6.32 | 0.995 |
| $k_{p2}$ (mg $g^{-1}$ $min^{-0.5}$) | 2.00 | 0.965 |
| $k_{p3}$ (mg $g^{-1}$ $min^{-0.5}$) | 0.93 | |

Since the hydrogel beads that contained GO showed marked improvements over the hydrogel beads composed purely of polymers, it can be said that the addition of the nanomaterial into the polymer matrix increased the intraparticle diffusion rate. At the same time, it is also observed that the amount of GO added had a positive effect on the removal rate thus explaining why the GO5 beads performed better than the GO1 beads.

TABLE 1

Experimental data and calculated parameters for the pseudo first- and second-order kinetic models for the adsorption of $Pb^{2+}$ onto CS-PAA, GO1 and GO5

| | | Pseudo first-order | | | Pseudo second-order | | | |
| --- | --- | --- | --- | --- | --- | --- | --- | --- |
| Beads | $Q_{exp}$ (mg $g^{-1}$) | $k_1 \times 10^{-3}$ ($min^{-1}$) | $Q_{e,\,cal}$ (mg $g^{-1}$) | $R^2$ | $k_2 \times 10^{-3}$ (g $mg^{-1}$ $min^{-1}$) | $Q_{e,\,cal}$ (mg $g^{-1}$) | H (mg $g^{-1}$ $min^{-1}$) | $R^2$ |
| CS-PAA | 86.48 | 5.50 | 63.82 | 0.994 | 0.22 | 89.77 | 1.78 | 0.999 |
| GO1 | 104.22 | 4.12 | 73.67 | 0.985 | 0.16 | 107.87 | 1.84 | 0.999 |
| GO5 | 110.17 | 3.75 | 77.60 | 0.981 | 0.14 | 113.90 | 1.83 | 0.998 |

Figure 17:
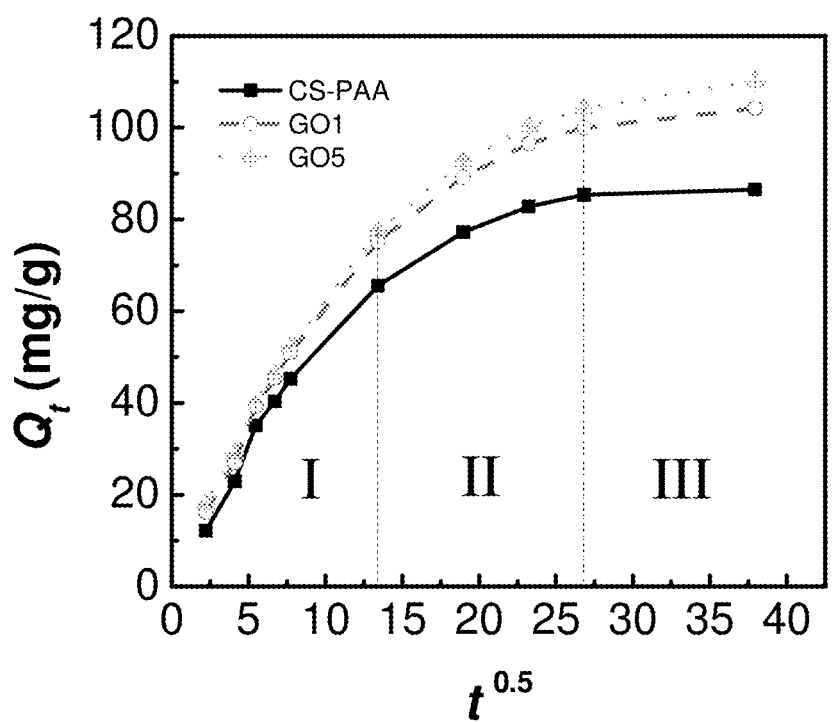
FIG. 17 shows kinetic adsorption results showing the effect of contact time on the adsorption of $Pb^{2+}$.

A plot of Q versus $t^{0.5}$ (FIG. 17) was constructed in order to determine the fit of the experimental data to the intraparticle diffusion model. FIG. 17 shows the intraparticle diffusion kinetics for the adsorption of lead onto CS-PAA, GO1 and GO5 hydrogel beads. The result is a non-linear plot across the time range which, upon close examination and linearization, reveals the presence of three regions implying a multi-stage adsorption process. The first stage (I) is characterized by the rapid external diffusion and adsorption Adsorption equilibrium studies were conducted by adding different hydrogel beads to 40 mL of 100-ppm $Pb^{2+}$ solutions at pH 5.0 and allowing contact for 24 h. The initial lead concentrations were varied from 50-350 mg/L and the metal uptake rates (Eq. 2) were used in fitting into Langmuir and Freundlich equations.

Adsorption equilibrium studies are important because they enable understanding of the interactive behaviors between solutes and adsorbents. This knowledge is necessary since it is essential in the design and optimization of adsorption systems and processes. Since a new material was developed in this study, the equilibrium data were fitted using the Langmuir and Freundlich isotherm models which are capable of expressing the relationship between the lead ions and the new hydrogel materials. The Langmuir isotherm model is based upon the assumption that the uptake of metal ions occurs on a structurally homogeneous adsorbent surface by monolayer adsorption where all the adsorption sites are identical and energetically equivalent and there is no interaction between the adsorbed ions. The linear form of the model is given as Eq. 9:

$$\frac{C_e}{Q_e} = \frac{1}{bQ_{max}} + \frac{C_e}{Q_{max}}$$

where $Q_{max}$ (mg g$^{-1}$) is the maximum adsorption capacity of the adsorbent material, $Q_e$ (mg g-1) is the amount of lead ions adsorbed at equilibrium, $C_e$ (mg L$^{-1}$) is the lead concentration in the liquid phase at equilibrium, and b (L mg$^{-1}$) is the Langmuir adsorption constant. In addition, a dimensionless constant $R_L$, called the equilibrium parameter, is calculated in order to identify whether the adsorption process is favorable (1>$R_L$>0), linear ($R_L$=1), unfavorable ($R_L$>1), or irreversible ($R_L$=0). This value is computed using Eq. 10:

$$R_L = \frac{1}{1+bC_0}$$

where $C_o$ (mg g$^{-1}$) is the initial lead concentration.

On the other hand, the Freundlich isotherm is based on the assumption that the adsorption of pollutants occurs on a heterogeneous surface through multilayer adsorption with the amount of solute adsorbed increasing infinitely with an increase in concentration. The linear form of the model is given by Eq. 11:

$$\log Q_e = \log K_f + \frac{1}{n}\log C_e$$

where $K_f$ and n are the Freundlich constants related to adsorption capacity of adsorbent and adsorption intensity, respectively. The value of n represents the favorability of the adsorption, where a value of n less than one indicates favorable adsorption over the entire range of concentration studied while a value of n greater than one means that the adsorption is favorable at high concentrations.

The isotherm data were plotted using the linearized equations of the isotherm models and the regression formulas were used to derive the isotherm parameters which are shown in Table 3 below. Looking at the correlation coefficients ($R^2$) of the Langmuir isotherms for the three hydrogel materials, it can be seen that these are very close to 1.0 and that these values are consistently greater than the $R^2$ values for the Freundlich isotherm. As such, the Langmuir isotherm model is more appropriate in describing the adsorption process and it can therefore be said that the mechanism for adsorption is monolayer on the homogeneous surfaces of the three different adsorbent materials.

TABLE 3

Parameters of the Langmuir and Freundlich isotherm models for the adsorption of $Pb^{2+}$ onto CS-PAA, GO1 and GO5.

| | Langmuir isotherm | | | | | Freundlich isotherm | | |
|---|---|---|---|---|---|---|---|---|
| Beads | $Q_{max}$ (mg/g) | b (L mg$^{-1}$) | $R_L$ | | $R^2$ | $K_f$ | n | $R^2$ |
| CS-PAA | 109.89 | 0.16 | 0.0180 0.0745 | < $R_L$ < | 0.9993 | 73.08 | 14.01 | 0.9885 |
| GO1 | 116.28 | 0.39 | 0.0075 0.0322 | < $R_L$ < | 0.9995 | 90.51 | 21.79 | 0.9734 |
| GO5 | 138.89 | 0.47 | 0.0062 0.0199 | < $R_L$ < | 0.9992 | 119.37 | 44.05 | 0.7708 |

To determine the adsorption capacities of the materials, the Langmuir $Q_{max}$ values were calculated and it can be seen that the capacity of the hydrogel beads to adsorb lead greatly improved with the addition of GO. This enhancement occurred because GO increased the overall surface area for adsorption as it also provided additional functional groups. This allowed the beads to attain maximum adsorption capacities higher than those of other sorbents reported in literature (Table 4 below). It can also be observed that the binding energy, b, of the sorption system increased with the addition of GO and that the binding energy increased with the increase in GO content. When the equilibrium parameter, $R_L$, values were calculated for the three nanocomposite materials it was found that the adsorption of lead was favorable for all cases. This can be gleaned from the $R_L$ values which were all between zero and one. Comparison of the values also indicated that the addition of GO into the CS-PAA polymer matrix enhanced the affinity since a greater affinity between the adsorbate and adsorbent can be inferred when $R_L$ is smaller. Furthermore, inspection of the n values show that lead adsorption was favorable at high concentrations for all three nanocomposite materials since all the n values were greater than unity. The addition of GO into the matrix also enhanced the favorability as shown by the fact that the CS-PAA hydrogel beads had a lower n value than the GO-infused beads. The relative GO content also had a positive bearing on the favorability as shown by the larger n value for GO5 relative to the n value for GO1.

TABLE 4

Comparison of $Pb^{2+}$ removal capacities of the hydrogel beads produced in this study and sorbents cited elsewhere based on maximum adsorption values of the Langmuir model.

| Material | $Q_{max}$ (mg g$^{-1}$) |
| --- | --- |
| MWCNT | 58.26 |
| Coated bentonite | 95.88 |
| Activated carbon | 51.81 |
| Chitosan beads | 34.98 |
| Activated carbon | 43.85 |
| Magnetic nanoparticles | 40.10 |
| PVA-PEI nanofibers | 90.03 |
| CS-PAA beads | 109.89 |
| GO1 beads | 116.28 |
| GO5 beads | 138.89 |

Example 4. Desorption and Reusability Experiments

Reusability experiments were conducted for the GO5-infused beads by subjecting the hydrogel beads to three adsorption-desorption cycles. For each adsorption cycle, the beads were shaken in 100 ppm $Pb^{2+}$ solutions at pH 5.0 for 24 h at a ratio of 1.5 g beads per 40 mL metal solution. For desorption, the beads were shaken in 50 mL of 0.1 M HCl solution for 24 h and the desorption efficiencies were calculated using Eq. 5:

$$\text{Desorption (\%)} = \left(\frac{C_{e,d}V_d}{(C_{o,a} - C_{e,a})V_a}\right) \times 100$$

where $C_{e,d}$ and $V_d$ refer to the equilibrium concentration and volume of desorption solution, respectively; $C_{o,a}$ and $C_{e,a}$ refer to the initial and equilibrium concentrations of the adsorption solution, respectively; and $V_a$ refers to the volume of adsorption solution. Prior to each desorption cycle, the beads were washed with deionized water to remove adhering lead solution. Since the beads come out acidic after each desorption cycle, it was necessary to equilibrate them with alkaline water to ensure that the succeeding adsorption takes place at the desired pH.

Figure 18:
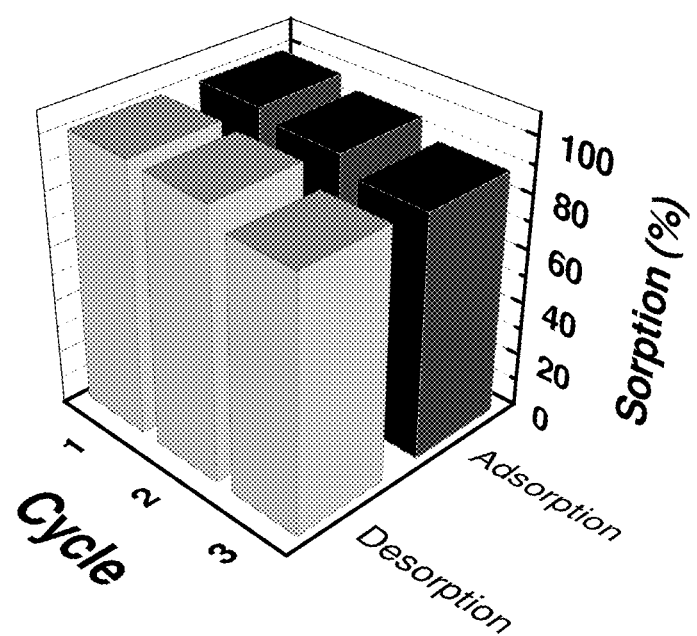
FIG. 18 shows sorption data for three cycles utilizing dilute HCl as desorption medium and using GO5 hydrogel beads.
Figure 20:
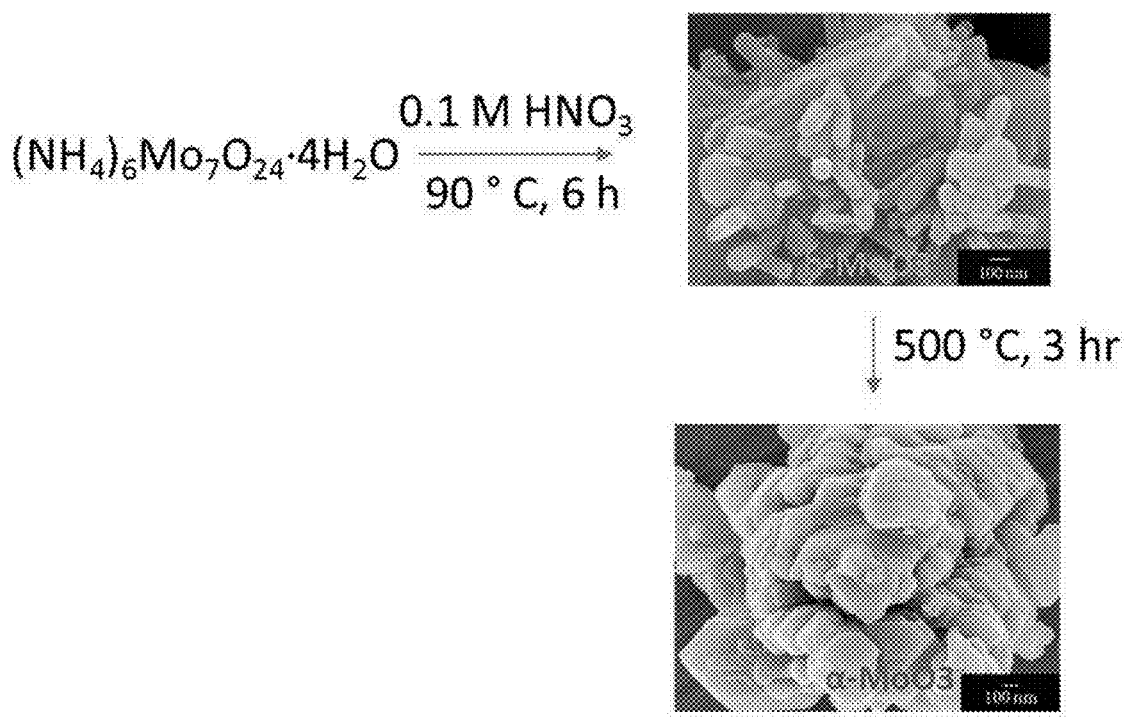
FIG. 20 shows the synthesis of two types of molybdenum oxide (h- and α-)

Cost is a crucial consideration in the evaluation of new adsorbent materials since adsorbent cost has a significant bearing on the economic feasibility of the treatment process. Focusing on the most efficient among the three hydrogel materials, the reuse potential of GO5 was then investigated by subjecting it to several cycles of adsorption-desorption. In this case, the desorption was carried out in batches using low-concentration hydrochloric acid which has been shown effective in desorbing $Pb^{2+}$ from polymeric materials. FIG. 18 shows the sorption data for three cycles utilizing dilute HCl as desorption medium and using GO5 hydrogel beads as model adsorbent owing to its superior performance. The experimental data as depicted in FIG. 18 show that desorption is very effective throughout the three cycles tested. Complete desorption was attained on the first cycle, 99.0% on the second cycle and 92.3% on the third cycle. As for the adsorption behavior, GO5 exhibited excellent metal uptake ability. Lead adsorption using fresh beads was 99.6% in the first cycle, 95.9% in the second cycle and 89.7% in the third cycle. The relatively high values obtained for both lead adsorption and desorption show that the polymer beads can be regenerated and reused for at least three cycles. This regenerative ability indicates good reusability and shows that the nanocomposite polymer beads could be applied to remove lead from water and wastewater with good feasibility.

Example 5. Comparative Lead Removal Capacity

Studies were conducted with the nanocomposite beads to determine their lead removal capacity, as described above. The preliminary results with the CS/PAA, CS/PAA containing 1% and 5% GO showed that the presence of 5% GO in the polymer composite beads enhanced lead removal by 20% compared to the CS/PAA beads alone (FIG. 19). Also a literature review comparing the new nanocomposite with previously known lead sorbents showed that the new nanocomposites have a significantly better lead removal capacity (FIG. 19).

Figure 12:
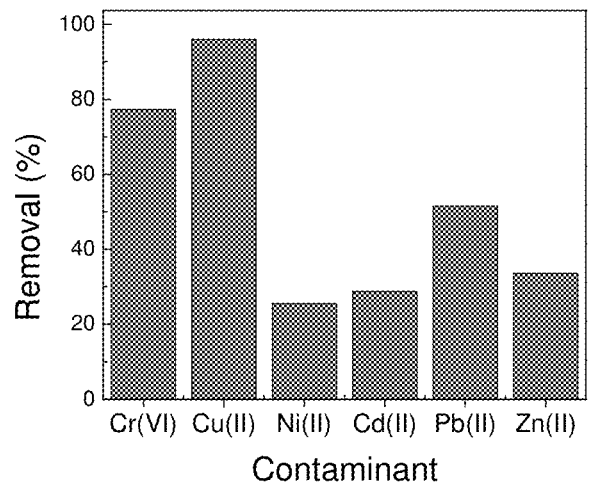
FIG. 12 shows average removal of cationic contaminants at 10 ppm, such as heavy metals by CS-PEI-GO.

Results of the chitosan-PEI-GO (FIGS. 12 and 13) also show that the presence of the co-polymer can lead to different adsorption capacities for different heavy metals. For instance CS-PAA-GO performed better for Pb(II) than CS-PEI-GO, while CS-PEI-GO performed better for Cr(VI) and Cu(II). Due to the nature of the co-polymers, it is possible to make nanocomposites with affinity for different heavy metals.

Figure 13:
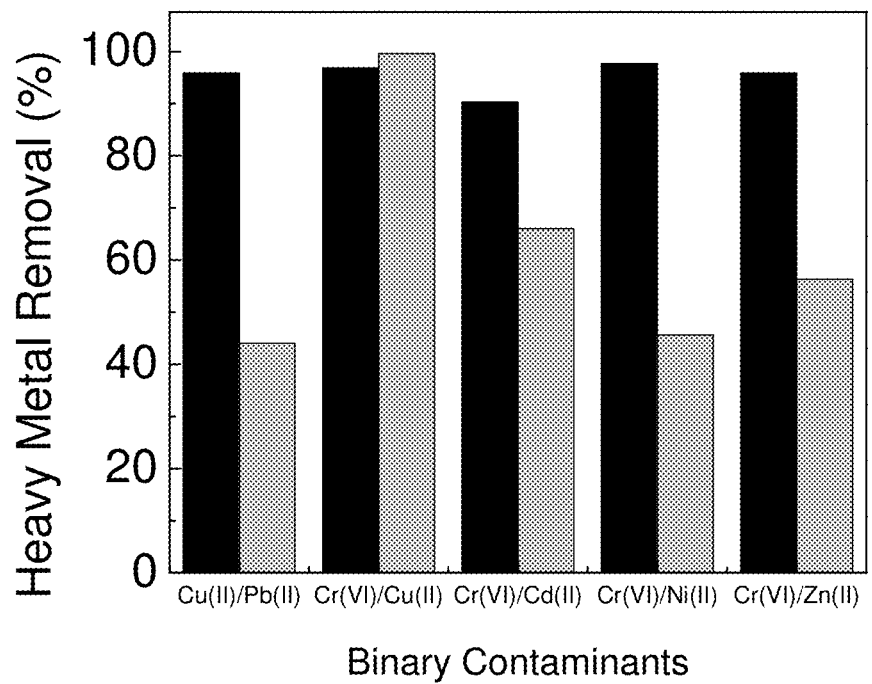
FIG. 13 shows average removal of binary contaminants at 10 ppm by CS-PEI-GO.

Results from FIG. 13, also show that the presence of other heavy metal contaminants in the solution might lead to a synergistic heavy metal removal, since higher removal was observed with a positively and a negatively charge metal were simultaneously present in the water.

Example 6. Comparative Antimicrobial Properties

Figure 23:
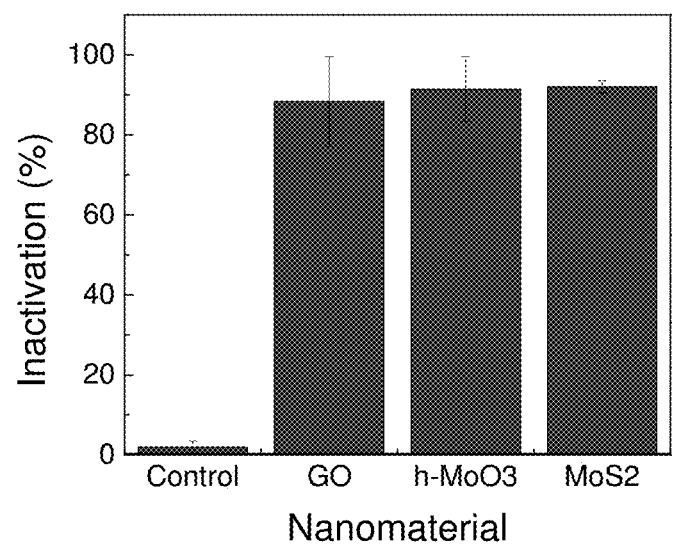
FIG. 23 shows the scanning electron microscopy of cells exposed and not exposed to the nanoparticles of $MoS_2$ after light exposure. Showing photocatalytic inactivation of microorganisms.

Coated surfaces with nanomaterials, such as GO, $MoO_3$ and $MoS_3$ showed microbial inactivation higher than 85% (FIG. 23). GO presented antimicrobial activity in the dark or under light. In the case of $MoO_3$ and $MoS_2$, they performed better under visible light conditions. These results show that $MoO_3$ and $MoS_2$ have photocatalytic activity that leads to their antimicrobial properties.

Figure 24:
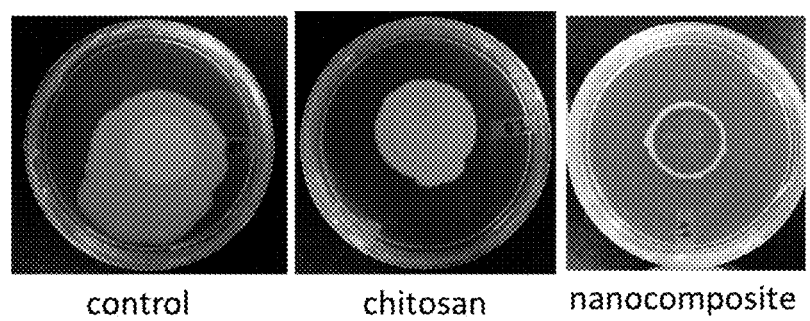
FIG. 24 shows microbial growth inhibition in the presence of nanocomposite coated membranes.

These nanomaterials can also be incorporated into the polymers and preserve the antimicrobial properties. In FIG. 24, it is possible to visualize that the nanocomposites have antimicrobial properties and have higher microbial growth inhibition than the pure chitosan or the non-coated membranes.

Example 7. Alternatives

The fabrication of chitosan beads with functional polymers, such as PAA, can be extended to other polymers, such as Polyethylenimine (PEI), Poly(vinyl alcohol) (PVA), Poly (allyl amine hydrochloride), Cyclodextrin polyurethanes (CDP), and Triallylamine polymer (TAP) among others to generate beads with the capacity to remove different hazardous chemicals, such as anions, cations and organic matter, other than heavy metals only. Table 5 below shows various useable polymers and their contaminant removal properties.

TABLE 5

| Polymer | Contaminant Removal |
| --- | --- |
| Triallylamine polymer (TAP) | Anions (e.g. $CrO_4^{2-}$, $PO_4^{3-}$, $NO_3^-$, $MnO_4^-$) |
| Polyethylenimine (PEI) | Anions (e.g. $CrO_4^{2-}$, $PO_4^{3-}$, $NO_3^-$, organic matter). |

TABLE 5-continued

| Polymer | Contaminant Removal |
|---|---|
| Poly(acrylic acid) (PA) | Cations (e.g. $Ni^{2+}$, $Pb^{2+}$, $Cd^{2+}$, $Cu^{2+}$) |
| Cyclodextrin polyurethanes (CDP) | Organic matter |
| Poly (allyl amine hydrochloride) (PAA) | Anions (e.g. $PO_4^{3-}$, $NO_3^-$, $NO_2^-$) |
| Poly(vinyl alcohol) (PVA) | Cations (e.g. heavy metals) |

Figure 21:
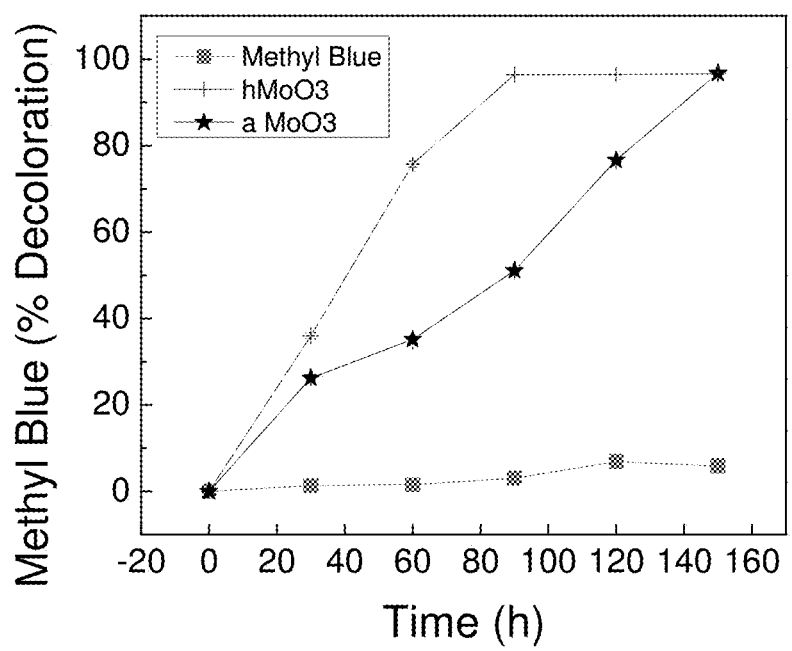
FIG. 21 shows the degradation capacity of methyl blue dye by the two types of $MoO_3$ nanoparticles under fluorescent light (photocatalytic activity of the nanomaterial)

Molybdenum oxide can also be used in the beads, since it can be activated by fluorescent or sun light to remove dyes from the water through a photocatalytic reaction. FIG. 19 shows the synthesis of two types of Molybdenum oxide (h- and α-). FIG. 21 shows the degradation capacity of Methyl Blue dye by the two $MoO_3$ nanoparticles under fluorescent light. The h-$MoO_3$ has better degradation capacity than α-$MoO_3$.

Figure 22:
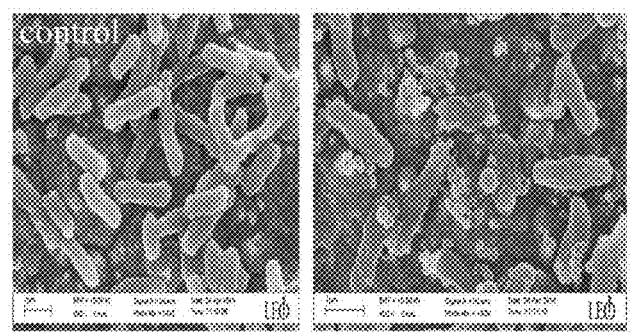
FIG. 22 shows the inactivation capability of different types of nanoparticles against E. coli.

These nanoparticles also show anti-microbial properties. FIG. 22 shows cellular damage caused by the presence of $MoS_2$ nanoparticles. These nanoparticles were photoactivated by visible light. FIG. 23 shows that the anti-microbial properties of different nanoparticles, such as GO, h-$MoO_3$ and $MoS_2$ are similar. However, h-$MoO_3$ and $MoS_2$ shows higher antimicrobial activity, as seen in FIG. 22, when in the presence of visible light.

REFERENCES

The following references, to the extent that they provide exemplary procedural or other details supplementary to those set forth herein, are specifically incorporated herein by reference.

NON-PATENT PUBLICATIONS

Dai, J.; Yan, H.; Yang, H.; Cheng, R., Simple method for preparation of chitosan/poly(acrylic acid) blending hydrogel beads and adsorption of copper(II) from aqueous solutions. *Chemical Engineering Journal* 2010, 165, (1), 240-249.

Yang, X.; Tu, Y.; Li, L.; Shang, S.; Tao, X., Well-Dispersed Chitosan/Graphene Oxide Nanocomposites. *ACS Appl. Mater. Interfaces,* 2010, 2 (6), pp 1707-1713.

Hummers Jr, W. S. and R. E. Offeman, Preparation of graphitic oxide. *Journal of the American Chemical Society,* 1958. 80(6): p. 1339-1339.

I. E. M. Carpio, C. M. Santos, X. Wei and D. F. Rodrigues, Toxicity of a polymer-graphene oxide composite against bacterial planktonic cells, biofilms, and mammalion cells. *Nanoscale,* 2012, 4, 4746-4756.

What is claimed is:

1. A method of preparing nanocomposite polymer hydrogel beads, the method comprising:
    mixing or sonicating one or more polymers in an acid or basic solution to produce a polymer mixture, wherein the one or more polymers comprise natural biopolymers and co-polymers, wherein at least one natural biopolymer is chitosan or alginate, and wherein at least one co-polymer is poly(acrylic) acid (PAA) or polyethylenimine (PEI);
    dissolving nanoparticles in an acid or basic solution with mixing or sonication to produce a nanoparticle solution, wherein the nanoparticles are graphene oxide (GO);
    adding the nanoparticle solution to the polymer mixture to produce a nanoparticle polymer mixture;
    stirring or sonicating the nanoparticle polymer mixture until a homogenous mixture is produced; and
    adding the homogeneous mixture dropwise into a coagulating agent to produce the nanocomposite polymer hydrogel beads, wherein the nanocomposite polymer hydrogel beads comprise polymer matrix material and the nanoparticles uniformly dispersed throughout the polymer matrix material in an amount of about 1% to about 5% by weight of the polymer matrix material, wherein the nanocomposite polymer hydrogel beads are cross-linked, and wherein the nanocomposite polymer hydrogel beads are capable of adsorption and removal of lead and other contaminants from water.

2. The method of claim 1 further comprising freeze drying the nanocomposite polymer hydrogel beads to form spongy nanocomposites.

3. The method of claim 1, wherein the coagulating agent is an alkaline solution.

4. A method of preparing nanocomposite polymer hydrogel beads, the method comprising:
    mixing one or more polymers in an acid or basic solution to produce a polymer mixture, wherein the one or more polymers comprise natural biopolymers and co-polymers, wherein at least one natural biopolymer is chitosan or alginate, and wherein at least one co-polymer is poly(acrylic) acid (PAA) or polyethylenimine (PEI);
    dissolving nanoparticles in an acid or basic solution with mixing to produce a nanoparticle solution, wherein the nanoparticles are graphene oxide (GO);
    adding the nanoparticle solution to the polymer mixture to produce a nanoparticle polymer mixture;
    stirring or sonicating the nanoparticle polymer mixture until a homogenous mixture is produced; and
    mixing the homogenous mixture to a crosslinking reagent allowing formation of the nanocomposite polymer hydrogel beads, wherein the nanocomposite polymer hydrogel beads comprise polymer matrix material and the nanoparticles uniformly dispersed throughout the polymer matrix material in an amount of about 1% to about 5% by weight of the polymer matrix material, wherein the nanocomposite polymer hydrogel beads are cross-linked, and wherein the nanocomposite polymer hydrogel beads are capable of adsorption and removal of lead and other contaminants from water.

5. The method of claim 4 further comprising freeze drying the nanocomposite polymer hydrogel beads to form spongy nanocomposites.

6. The method of claim 1, further comprising:
    preparing a packed bed column filtration device or fluidized bed reactor comprising the nanocomposite polymer hydrogel beads; and
    passing a contaminated water stream through the packed bed column filtration device or fluidized bed reactor to remove lead and other contaminants from the contaminated water stream.

7. The method of claim 4, further comprising:
    preparing a packed bed column filtration device or fluidized bed reactor comprising the nanocomposite polymer hydrogel beads; and
    passing a contaminated water stream through the packed bed column filtration device or fluidized bed reactor to remove lead and other contaminants from the contaminated water stream.

8. A method for removing contaminants from a contaminated water stream, the method comprising:
    preparing a packed bed column filtration device or fluidized bed reactor comprising the nanocomposite polymer hydrogel beads prepared by the method of claim 1; and
    passing a contaminated water stream through the packed bed column filtration device or fluidized bed reactor to remove the contaminants from the contaminated water stream.

9. A method for removing contaminants from a contaminated water stream, the method comprising:
    preparing a packed bed column filtration device or fluidized bed reactor comprising the nanocomposite polymer hydrogel beads prepared by the method of claim 4; and
    passing a contaminated water stream through the packed bed column filtration device or fluidized bed reactor to remove the contaminants from the contaminated water stream.

* * * * *